United States Patent [19]
Beitel et al.

[11] Patent Number: 5,339,423
[45] Date of Patent: Aug. 16, 1994

[54] SYSTEM FOR ACCESSING OBJECTS EXTERNAL TO AN APPLICATION USING TABLES CONTAINING PATH DEFINITIONS

[75] Inventors: Bradley J. Beitel, Woodside; Charles L. Haug, Santa Cruz; Elba M. Sobrino, San Jose, all of Calif.

[73] Assignee: International Business Machines Corporation, Armonk, N.Y.

[21] Appl. No.: 28,718

[22] Filed: Mar. 9, 1993

Related U.S. Application Data

[63] Continuation of Ser. No. 892,683, May 27, 1992, abandoned, which is a continuation of Ser. No. 367,081, Jun. 16, 1989, abandoned.

[51] Int. Cl.$^5$ .................. G06F 12/00; G06F 15/40
[52] U.S. Cl. .................. 395/600; 364/282.1; 364/282.3; 364/283.1; 364/943.5; 364/DIG. 1
[58] Field of Search .................. 395/600, 650

[56] References Cited

U.S. PATENT DOCUMENTS

| | | | |
|---|---|---|---|
| 4,366,479 | 12/1982 | Mori et al. | 340/825.05 |
| 4,510,492 | 4/1985 | Mori et al. | 340/825.05 |
| 4,633,430 | 12/1986 | Cooper | 364/900 |
| 4,635,189 | 1/1987 | Kendall | 395/600 |
| 4,648,061 | 3/1987 | Foster | 395/200 |
| 4,941,084 | 7/1990 | Terada et al. | 395/650 |
| 4,996,662 | 2/1991 | Cooper et al. | 364/900 |
| 5,008,853 | 4/1991 | Bly et al. | 364/900 |

FOREIGN PATENT DOCUMENTS 1226943  9/1987  Canada.

OTHER PUBLICATIONS

Yankelovich & Meyrowitz "Reading and Writing the Electronic Book" Computer, Oct. 1985, pp. 15-30.

*Primary Examiner*—Thomas C. Lee
*Assistant Examiner*—Peter Y. Wang
*Attorney, Agent, or Firm*—Perman & Green

[57] ABSTRACT

A computer/software system is described which enables a user to produce and display an audio/visual application using a library of image, audio and story objects. The system creates a first library data file which includes a list of application files. It then creates a bill of materials listing for each application file, each listing comprising a first field area for an object name and a second field area for a path definition to where said object is listed in another application bill of materials and physically exists. The system then runs the application and accesses all objects listed therein, any object with a path listing, being accessed from the file indicated by the path definition. A method of searching, which employs the path definitions is also described.

5 Claims, 6 Drawing Sheets

LIBRARY EDITOR -

LIBRARY TABLE

| TYPE | D: | NAME | |
|---|---|---|---|
| APPLIC | | DEMO1 | PRESENTS CURRENT PRODUCT LINE |
| APPLIC | | DEMO2 | PRESENTS PLANNED NEW PRODUCTS |
| APPLIC | | MYAUDIO | GENERAL PURPOSE MUSIC |
| APPLIC | | MYIMAGES | GENERAL PURPOSE PICTURES |
| APPLIC | E: | DEMO1BU | BACKUP |
| APPLIC | E: | DEMO2BU | BACKUP |

STORY EDITOR
AUDIO EDITOR
CONVERT EDITOR
DIGITIZE EDITOR
IMAGE EDITOR
LIBRARY EDITOR

FIG. 1

LIBRARY EDITOR

LIBRARY TABLE

| PROMPT | PROCESS | EDIT | INQUIRE | PRINT | EXIT | HELP |

―10

LIBRARY: XXXXXXXXXX

| FR | TYPE | D: NAME | | COMMENTS |
|---|---|---|---|---|
| | | | | |

(F=FILE, R=REFERENCED FILE, D=DEFAULT DRIVE)

LIBRARY EDITOR — APPLICATION TABLE

| PROMPT | PROCESS | EDIT | INQUIRE | PRINT | EXIT | HELP |

APPLICATION: XXXXXXXXXXX

| FR | TYPE | NAME | | D: REFERENCE |
|----|------|------|--|--------------|
|    |      |      |  |              |

(F=FILE, R=REFERENCED FILE, D=DEFAULT DRIVE)

FIG. 3

LIBRARY EDITOR –

APPLICATION ACTION BAR

LIBRARY EDITOR -

LIBRARY TABLE

| TYPE | D: | NAME | |
|---|---|---|---|
| APPLIC | | DEMO1 | PRESENTS CURRENT PRODUCT LINE |
| APPLIC | | DEMO2 | PRESENTS PLANNED NEW PRODUCTS |
| APPLIC | | MYAUDIO | GENERAL PURPOSE MUSIC |
| APPLIC | | MYIMAGES | GENERAL PURPOSE PICTURES |
| APPLIC | E: | DEMO1BU | BACKUP |
| APPLIC | E: | DEMO2BU | BACKUP |

FIG. 7

APPLICATION TABLE

| FR | TYPE | NAME | |
|---|---|---|---|
| F | IMAGE | MODEL1 | ENTRY COST |
| F | IMAGE | MODEL2 | INTERMEDIATE |
| | IMAGE | MODEL3 | (IMAGE NOT YET OBTAINED) |
| F | AUDIO | OPENING | DIFFERENTIATE THE MODELS |
| F | AUDIO | CLOSING | SUMMARIZE ADVANTAGES |
| F | STORY | DEMO1 | SHORT DEMO VERSION |

FIG. 8

APPLICATION TABLE

| FR | TYPE | NAME | | D: | REFERENCE |
|---|---|---|---|---|---|
| R | IMAGE | SKIING | COUPLE ON A LIFT CHAIR | E: | IMAGES4 |
| R | IMAGE | BIKING | WOMAN IN RACING SUIT | E: | IMAGES4 |
| R | IMAGE | JOGGING | MAN ON A TRACK | E: | IMAGES4 |
| F | AUDIO | INTRO1 | WELCOMING SPEECH | | |
| R | AUDIO | STARWARS | OPENING THEME | F: | AUDIO3 |
| R | AUDIO | PEANUTS | PIANO RENDITION | F: | AUDIO3 |
| R | STORY | DEMO1 | MAIN CONTROLLING STORY | | DEMO1 |

FIG. 9

SYSTEM FOR ACCESSING OBJECTS EXTERNAL TO AN APPLICATION USING TABLES CONTAINING PATH DEFINITIONS

This is a continuation of copending application Ser. No. 07/892,683 filed on May 27, 1992, now abandoned, which is a continuation of copending application Ser. No. 07/367,,081 filed on Jun. 16, 1989, now abandoned.

This invention relates to computer-based systems for producing audio/visual presentations, and more particularly, to a method and apparatus for enabling a personal computer to access audio/visual materials.

BACKGROUND OF THE INVENTION

As personal computers (PCs) have improved in processing capability, various application programs have been developed which enable the creation and display of audio/visual presentations. In the mid 1980's, the IBM Corporation marketed a PC application program entitled: "PC Storyboard" which enabled the preparation and display of color presentations on an IBM PC. The PC Storyboard software was comprised of four program segments. A first segment, entitled: "Picture Maker" enabled the creation and modification of pictures in medium resolution graphics. Picture Maker included commands to write text, draw figures, generate charts and to cut and paste images between pictures. A second segment, "Picture Taker", was employed to capture picture images of scenes from other PC application programs "Story Editor" was a third segment which enabled the PC user to organize pictures into presentations (stories). It provided for the selection of a variety of picture-to-picture transition methods that allowed one picture to dissolve into another. Variables such as display times, colors and whether the picture would be developed as a full picture or as a series of partial pictures, were also enabled by this software. Storyboard also included a segment entitled: "Story Tell" which enabled the presentation of stories assembled by the other software segments.

While Storyboard was, for its time, a remarkable product for the PC, it lacked a number of capabilities. It was essentially a visual presentation assembler and presenter; it lacked any significant capability for audio presentation assembly; for synchronization of an audio presentation with the visual presentation; for interspersing during the presentation, commands which enabled logical and data processing interactions between the viewer and the PC; etc. It furthermore required considerable education of the user before acceptable level presentations could be produced.

Recently, the increased use of windows, pull-downs, advanced cursor-selection techniques and other display-oriented, user interface instrumentalities have come into favor. These enable a PC user to directly interface with a PC's software and to control it largely from cursor-controlled screen selections. Substantial capability, color presentation systems with synchronized audio have not, to the Inventors' knowledge been made available for the PC market.

In such systems, it is often desirable to enable a plurality of presentation programs to have access to image and audio libraries and to utilize them as necessary. However, it is also desirable to minimize the amount of duplicated data in storage and to enable revisions of individual libraries without the requirement to find all references thereto and to correct them.

Accordingly, it is an object of this invention to provide a computer-based audio/visual presentation system with a simple library addressing scheme.

It is another object of this invention to enable library alterations without the need to revise multiple references to the library.

It is still another object of this invention to enable ready searching of a library with a user-friendly interface.

SUMMARY OF THE INVENTION

A computer/software system is described which enables a user to produce and display an audio/visual application using a library of image, audio and story objects. The system creates a first library data file which includes a list of application files. It then creates a bill of materials listing for each application file, each listing comprising a first field area for an object name and a second field area for a path definition to where said object is listed in another application bill of materials and physically exists. The system then runs the application and accesses all objects listed therein, any object with a path listing, being accessed from the file indicated by the path definition. A method of searching, which employs the path definitions is also described.

BRIEF DESCRIPTION OF THE DRAWINGS

FIG. 1 is an illustration of the software segments of a system which includes the invention.

FIG. 2 shows a library table screen used by the invention.

FIG. 3 shows a library application table screen used by the invention.

FIG. 7 illustrates a screen presentation of a first level library table showing various applications available to the audio visual system.

FIG. 8 is a display of a "bill of materials" which appears on the screen when one of the applications shown in FIG. 7 is selected.

FIG. 9 is another "bill of materials" displayed on the screen and indicates the use of reference addressing.

DETAILED DESCRIPTION OF THE INVENTION

Figure 4:
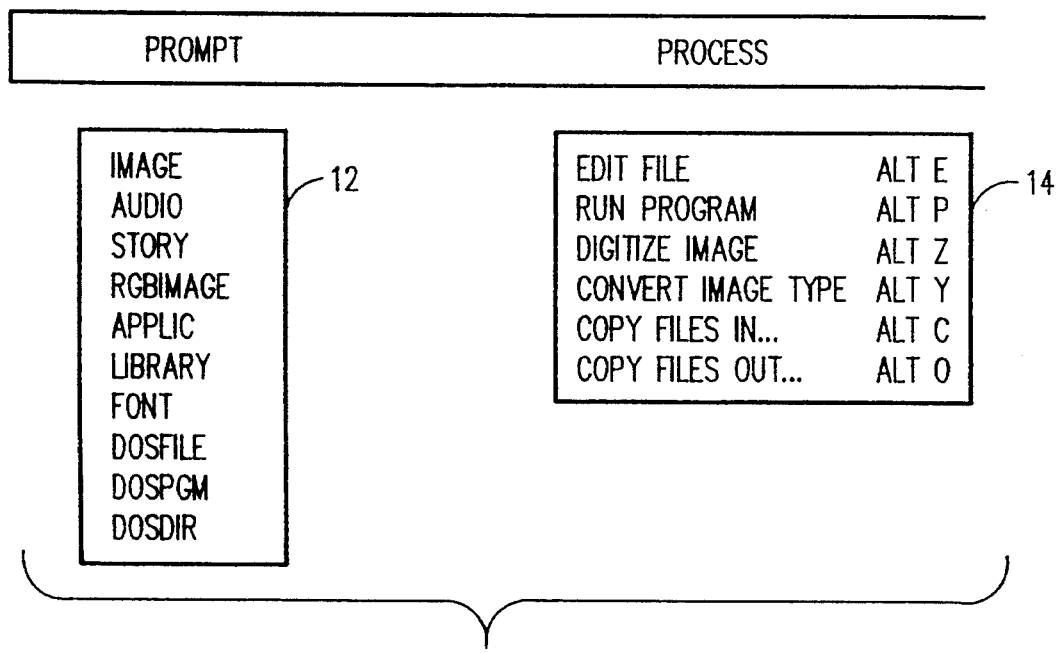
FIG. 4 shows menus which are displayed when either Prompt or Process actions on a screen "action bar" are selected on a library application screen.

It is to be understood initially that the invention may be configured from either software or firmware, either of which may be adapted to run on a PC, such as the IBM PS/2. As is known, most modern PCs are constructed to employ a bus structure with PC/subassembly communications taking place, in the main, over the bus or buses. Characteristically, a graphics capable PC is provided with an arithmetic/logic unit, random access memory, various disk drives for storing quantities of readily available data, and a color display including a keyboard. The display is adapted to show an image or images, along with a cursor (or cursors) which enable user selection of various software subroutines. All of the aforementioned structure is conventional and knowledge of its operation is assumed in the succeeding description.

Referring now to FIG. 1, six major software segments of a software system incorporating the invention are schematically shown. The overall program includes a library editor; image editor; digitize editor; convert editor; audio editor; and a story editor.

In brief, the library editor manages the retrieval, processing and storing of audio/visual "objects" (i.e., an "object" is an image, audio file or story used in the creation of an audio/visual presentation). The image editor is primarily used to add text and draw graphics onto images; to define special field types such as input or cursor actuation fields, and to do other image manipulations such as resizing or rotating. The digitize editor is used for converting video camera (analog) input images into computer digital form. These images are then stored as files in the PC where they become available for use in the audio/visual operation. The convert editor is used to modify images captured by scanners or other image digitizing systems and to convert them into a form usable in the audio/visual system of this invention. The audio editor enables the recording (digitizing) and editing of sound. It also enables the insertion of time and other signals which are subsequently used to control the presentation of the story. The story editor assembles audio/visual presentations (called stories) and pulls together all of the data from the keyboard, files and various editors to present a completely synchronized, audio/visual presentation.

LIBRARY EDITOR

Each time the software system of this invention is initially operated, library editor is automatically invoked as the first editor accessed. The library editor provides access information on all objects within the software segments and their paths. The user selects a particular audio/visual object to work with (such as an image or a story), and then selects the type of processing to perform on the object (such as edit, digitize, convert, etc.). These choices automatically determine which of the other editors is to be invoked. Thus, the other editors are invoked according to the object and task selected rather than by an explicit editor name. The selected object is automatically retrieved for the invoked editor at the same time the editor is activated, so that the object is present for use as soon as the editor comes on-line.

At the conclusion of processing by a respective editor, control returns to the library editor, with any object changes now saved to disk. Once back in the library editor, the user can select either another object or object processing or can exit to other operations. Thus, movement to and from editors is normally routed through the library editor. In essence, the library editor is the "main menu" from where branching to all individual object editors occurs.

All objects, such as images, stories and audio files are listed in the library editor's displays. It is to be remembered that it is these object lists that are used by the system to cause various object editors to be invoked and it is the paths to the objects indicated in these lists that are used to control where objects are retrieved from and saved to.

While the library within the library editor contains information about various directories and objects, (e.g., type, name, description and path), it does not contain the directories or objects themselves. It essentially is an index which points to an object, wherever that object may reside within the system.

The term "application" will be used hereinbelow and it is meant to refer to a collection of objects grouped together in the library in a way that is meaningful to the user. An application may be a series of objects usable for a product presentation, an advertising message, or another audio/visual presentation. The application will have a name and be listed and accessed by that name. Furthermore, each application will have a secondary list embedded in it which, in addition to indicating the particular application, lists all of the various objects which are part of the application (i.e., a "bill of materials" for the application).

In the discussion below, a plurality of display screens will be described which enable modes of interaction between the user and the system. Each screen presents a table, window, pull-down, action bar or combination thereof which provides for information feedback from the system to the user and vice-versa. Screens are generally provided with a plurality of cursor kinds (e.g., highlight bars, underlines, emphasis marks, etc.) to enable a user to know which portion of a screen is enabled for an input. Some cursor kinds automatically move on the screen (e.g., while a software segment is "playing") or are moved by the user's actuation of a mouse, keyboard keys (e.g., right, left, up, down arrows, tab key, backspace, etc.) or other cursor control instrumentalities.

Turning now to FIG. 2, a first level library editor screen entitled "library table" is illustrated. This table lists the various applications and their names that are contained within the library editor. It forms the highest level directory to all subsidiary directories related to the various listed applications. An "action bar" 10 appears on line 1 of the screen and contains a number of action indications. The placement of a cursor at any listed action indication will invoke a pull-down with a listing of the available functions pertaining to the chosen action.

On line 3 of the screen, the term "library" indicates which library is being viewed. The library is selected when a command line is invoked by the user. Assuming that the PC operates with a disk operating system (DOS), each library is physically one DOS directory.

The library table of FIG. 2 comprises a plurality of columns. The left-most column (FR) will have either an F, R, or a blank adjacent a line. F indicates the object is physically resident in the currently connected directory. R indicates that the named file is located in another directory. A blank indicates a comment. The next column to the right "Type" defines the kind of file indicated on the line. In most cases the indication will be "application". The next column (headed by D:) indicates, if a D is present in a line, that the file is on a drive other than the current one on-line. The Name column indicates the assigned name of the application and the Comments column includes any descriptive comments regarding the file.

In FIG. 7, an example of a library table is shown with certain of its columns filled in. Note that all of the listed files are application files; that the last two application files are housed on drive e (which is not the current drive on-line); that the names of the files are as indicated; and that the adjacent comments describe, briefly, the subject matter of each application. For instance, Demo 1 "presents current product line" as an audio/visual presentation.

Each line within a library table indicates the name and gross contents of the application. In order to determine the detailed contents of an application, the "application" table associated with the particular application must be accessed. This action will bring up for view, a "bill of materials" which lists all of the objects associated with the application.

An application table may be selected by placing the cursor on the line of the library table where the application is named and selecting, from action bar 10, a processing action to perform (e.g., edit). When an application is selected, the system retrieves an existing application (or enables the creation of a new one, if that is desired) and then displays its corresponding application table screen which lists all images, stories, audio files, etc. associated with the application.

Turning to FIG. 3, a representative application table is shown. This table, as aforestated, displays the contents of one specific application. Like the library table, the application table contains on its first line, an action bar 10 containing a number of indicated actions which, when invoked, cause the display of detailed pull-downs. Line three contains the indication "application" along with the name of the application. The left most table column (FR) indicates whither the object listed on the line is physically resident in this application. An F indicates the object is resident in this application directory. If an R (for "reference") is shown, it indicates that the object listed is not physically resident in this application directory. A reference to where that object is actually stored is found in the right-most columns of the table (i.e., D: Reference). There is inserted path information pointing to the location where the object is stored. A blank in the FR column signifies the line is a comment-only type line.

The Type column denotes whether the object is an image, audio, story or other object. The Name column contains a user-assigned name for the object. The column to the right of the Name column includes comments which describe something about the object to enable the user to recall its substance. For example, as shown in FIG. 8, an exemplary application table is illustrated having three image objects, two audio objects and one story object. Each image object has an assigned name (e.g. "Model1") which enables that object file to be identified. A comment next to each object listing explains something about the object.

It is from an application table screen that access to the object editors occurs. While not shown, a cursor is present on the screen and is free to roam, under user control, from line to line and scroll from page to page. To process an existing object, the cursor is placed on the line for the object and an action from the action bar is invoked. This results in display of a pull down listing of available functions with the action classification. If then, a cursor is placed next to a function (e.g., "edit file") and a selection made, the proper editor program segment is accessed. For instance, the "edit file" action invokes the audio editor for an audio object, image editor for an image object, and story editor for a story object.

Figure 5:
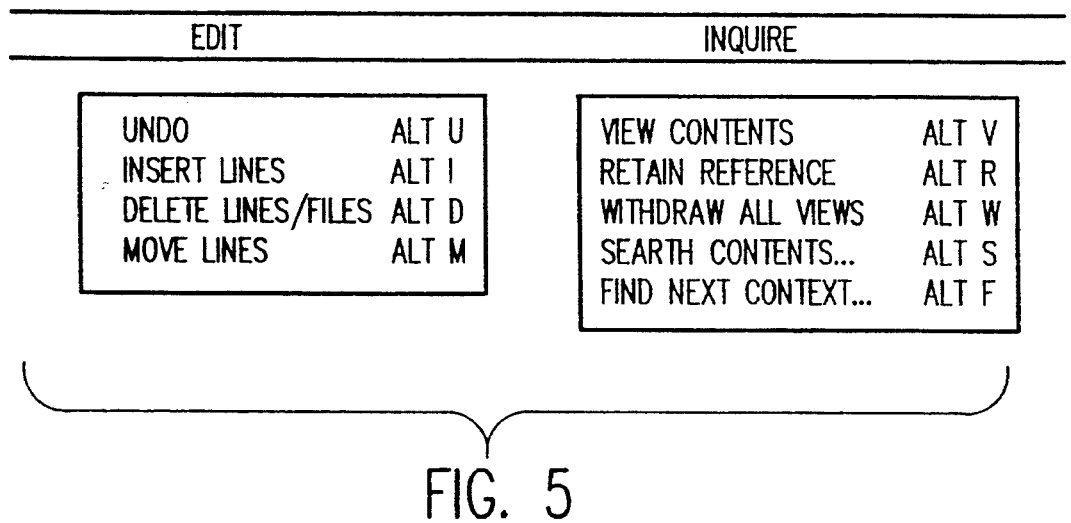
FIG. 5 shows menus which are displayed when either Edit or Inquire actions on a screen "action bar" are selected on a library application screen.
Figure 6:
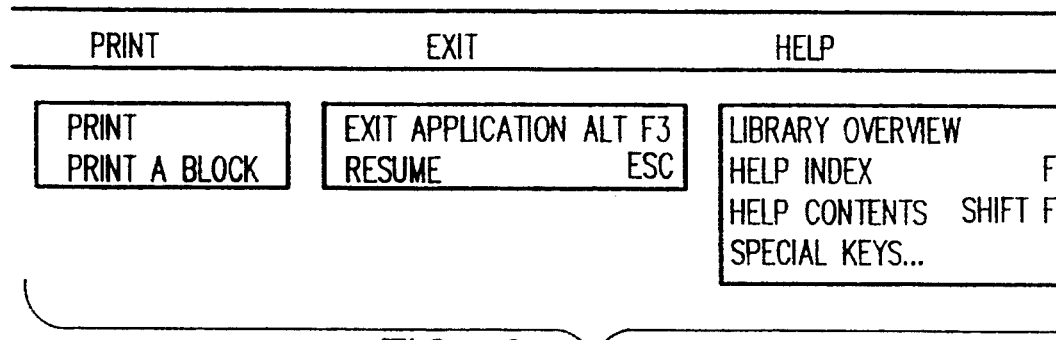
FIG. 6 shows the menus which are displayed when either Print, Exit or Help actions on a screen "action bar" are selected on a library application screen.

Turning to FIGS. 4-6, the pull-downs (and related functions) which result from invoking one or more actions in action bar 10 are illustrated. As shown in FIG. 4, a cursor indication placed at the Prompt location in action bar 10 and a user actuation of a Prompt-associated keystroke (e.g. by typing P) causes pull-down 12 to appear. This pull-down both shows and enables the available entries which can be made in the "type" column at a selected line in an application table.

Placing the cursor at the Process location in the action bar enables pull-down 14 to be displayed. If the cursor is then placed next to the "edit file" line and the "Enter" key depressed by the user, an appropriate editor is selected as above described. This, then, enables the particular object listed in the application table to be appropriately altered by one of the editor program segments. The "run program" line causes a DOS or OS/2 program to be executed. The remaining listings shown in pull-down 14 are self-explanatory.

In FIG. 5, the Edit action pull-down is shown as well as the Inquire action pull-down. In FIG. 6, the Print, Exit and Help pull-downs are shown. Each of the lines within each of the pull-downs defines a particular task which is enabled upon the appropriate positioning of a cursor and selection of the task. For instance, in the Edit pull-down, placing a cursor next to the "undo" line and user depression of an Enter key removes the last edit change that affected the application table screen, such as an insert or a move.

Referring now to FIG. 9, an application table is shown having a number of referenced objects listed therein. As aforestated, references allow objects to be associated with an application without physically residing in the same directory. For example, assume a user keeps all audio music stored in a single application/directory such as, MYAUDIO. This is attractive because all music is in one place for convenient access, maintenance and backup. If now, for various demonstration applications, different pieces of music are desired, there are a number of approaches possible to link the demonstration and the music together. The music could be physically copied into the different directories. This would be unacceptable as much duplicate storage and multiple copies would be required. Alternatively, the different demonstration stories could place specific path information with every "play" type statement. This would avoid storage duplication since the demonstration applications would still be using the original audio versions. However, if any software path change needed to be made to the MYAUDIO file (e.g., if it was placed on a different drive), all path entries on "play" statements related to the music would require finding and changing.

References in this invention work around these drawbacks by allowing an object to be listed in an application as if it were physically there. Path information is provided in the right-most column of the application table and redirects access to the application and file where the object is actually physically located. In FIG. 9, examples of referenced paths are shown. The referenced object, SKIING is listed as an image object. This enables any "show" statement in a story working from this application to use SKIING as an object name without requiring any special path designation—exactly as is done for any object physically stored in this application such as the file INTRO 1. At story run-time, when a play statement is encountered with SKIING, the program automatically causes the path "e:IMAGES4" to be searched for the image object SKIING. Hence, while SKIING both can be played and edited when working from this application, the actual physical file is continually retrieved from and stored in the referenced application/directory e:IMAGES4. Thus, only one path designation need be maintained for SKIING—the one on the object line in the application table—where SKIING is actually resident.

When applications being referenced all reside on-line, the benefit from the reference procedure is that duplicate storage is not needed—only one copy of an object need be maintained and other applications outside of the one owning the object can access it by pointing to it (referencing it). Another benefit is that these path references do not have to be repetitively entered and spread throughout for each object. Each application needs just one reference (path designation) per each object referenced. Thus, this enables one object copy to be accessed by all.

EXPANDING & WITHDRAWING VIEWS (REFERENCES & SEARCHES)

Figure 10:
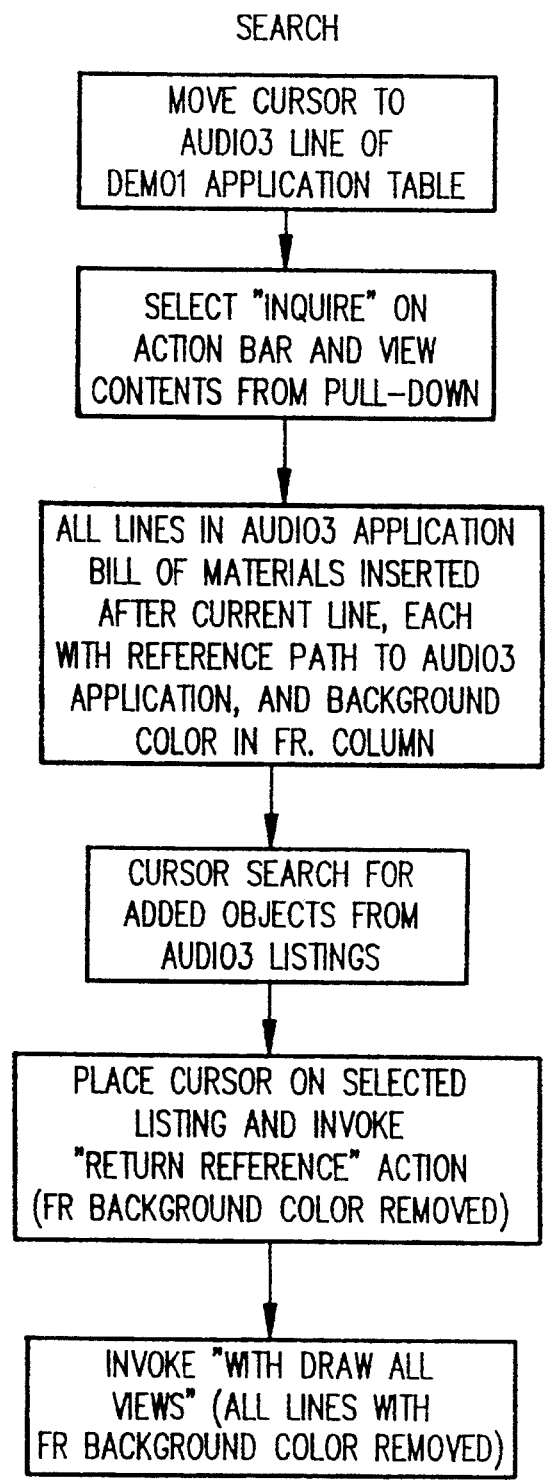
FIG. 10 is a high level flow diagram showing the various actions involved in searching a referenced file and accessing objects therefrom.
Figure 11:
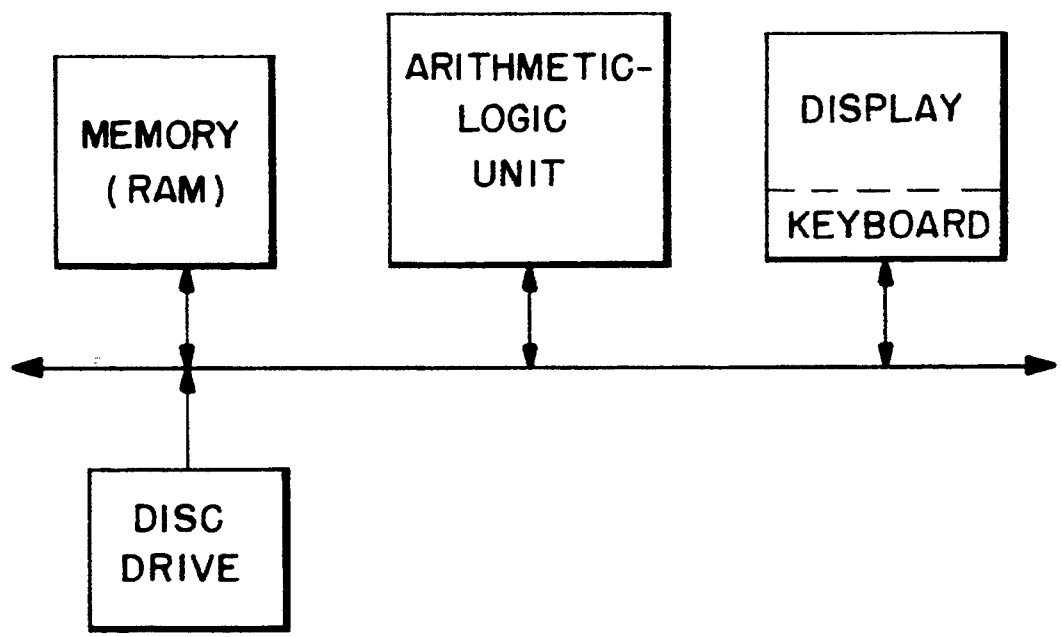
FIG. 11 is a block diagram showing a system for implementing the invention.

A reference to an object in another application/directory can be entered from "scratch" by the user keying in the objects name and path. Typically, however, it is difficult to remember all the necessary information regarding the precise object name and path, or to find where the object really is. To assist in this, the library editor has an "INQUIRE" action which include the VIEW CONTENTS action (see FIG. 4). The following search procedure, in addition to being described below,. is illustrated in FIG. 10.

Assume the existence of a master application/directory for audio named AUDIO3 which holds all music. Assume a user is working in another application called DEMO1 and wishes to insert references to some music, so that it can be accessed from stories being constructed. Assume at the top of the application table listing for DEMO1 there is a line as follows:

| FR | Type | Name | | D: Reference |
| --- | --- | --- | --- | --- |
| R | Applic | AUDIO3 | master copies of music | F: AUDIO3 |

This line is a reference which points to another application instead of to a single image, audio or story object.

The user places the cursor on this line and selects the action VIEW CONTENTS. This causes all the lines associated with application AUDIO3 to be displayed on the screen immediately following the current line. It is as if an application table display for AUDIO3 is now resident inside of the application table display for DEMO1. Everything below the AUDIO3 line is shoved down in the table as far as needed to accommodate the new display of object, comment and reference lines from AUDIO3. There are three things different about these new lines however.

1. All object lines display with R in the FR column since every F or R type line in AUDIO3 is a reference from the perspective of the current application DEMO1. Therefore, for an object line that has an F in it during the display of the AUDIO3 application table itself, that line has an R in DEMO1 because that object is physically not stored in DEMO1.

2. All former F type lines now have their reference fields in the rightmost columns filled in with the path information needed to reference the application AUDIO3. All former R type lines continue to display the reference information they previously had in AUDIO3.

3. All incoming lines (including the comment lines, be they blank or non-blank) have a background color displayed in their FR column. This designates these lines to be "view" lines—lines for temporary use only.

Once the view is assembled (with the cursor now on the last view line added to the display), the cursor is free to roam. Thus, the user can scroll back and forth through this list, browsing as desired. Wherever the user sees a line to be added to this DEMO1 application bill of materials, the cursor is placed on that line and the RETAIN REFERENCE action invoked (see FIG. 5). This removes the background coloring from the FR column for that line and in effect makes the reference a "permanent" one in the DEMO1 application and no longer a "temporary" one. Thus a user can pick as many references from this view list as needed and "retain" them for DEMO1.

Assume, for example, that two lines are retained, i.e., STARWARS and PEANUTS.

Now the user needs to get rid of the rest of the AUDIO3 view from the DEMO1 display. The user invokes the action WITHDRAW ALL VIEWS (FIG. 5). This action removes all lines that have background coloring in the FR column and thereby removes the entire view of AUDIO3 except for the two lines that were retained and had the background color previously removed. The chosen lines are now saved in the bill of materials file for application DEMO1 when they are updated to disk. The display is now as follows:

| FR | Type | Name | | D: Reference |
| --- | --- | --- | --- | --- |
| R | Applic | AUDIO3 | master copies of music | f: AUDIO3 |
| R | AUDIO | STARWARS | opening theme | f: AUDIO3 |
| R | AUDIO | PEANUTS | piano rendition | f: AUDIO3 |

The INQUIRE actions are used to view applications and retain lines within an application. The VIEW CONTENTS action enables the application's contents to be displayed temporarily, whereas the RETAIN REFERENCE allows lines to be selectively extracted for keeping, and WITHDRAW ALL VIEWS removes the temporary display. SEARCH CONTENTS does the same as VIEW CONTENTS except SEARCH CONTENTS only displays those lines that successfully meet the search criteria. For example, the user could search an application for only image type objects that contained the terms "auto" followed by "sport" within their name and description. All lines that qualify would be displayed with background coloring in the FR column. Thus these too are temporary lines that go away during a WITHDRAW ALL VIEWS, if not retained beforehand.

References are particularly useful in an environment of large collections of images and audio objects. Assume an image collection that encompasses 4000 pictures spread across 4 applications/directories. Also assume the applications holding these images are registered within the current library file as follows:

| FR | TYPE | NAME | | D: Reference |
| --- | --- | --- | --- | --- |
| R | Applic | IMAGES1 | section 1 of collection | e: IMAGES1 |
| R | Applic | IMAGES2 | section 2 | e: IMAGES2 |

| FR | TYPE | NAME | | D: Reference |
|----|------|------|------|------|
| R | Applic | IMAGES3 | of collection section 3 of collection | e: IMAGES3 |
| R | Applic | IMAGES4 | section 4 of collection | e: IMAGES4 |

These four reference lines could be inserted in every other application bill of materials in use. Now, any time a particular category of picture is sought, a SEARCH CONTENTS action can be invoked on each of the referenced applications. From the lines the four searches return ("hits"), references to explicit images can be retained within the application bill of materials in process. (All the other lines the search returned will be discarded when the application is exited or "withdrawal views" is selected.) Thus every individual application can have ready access to the master collection bill of materials without having to exit the current application.

This takes on added significance when considering off-line storage. Assume for the example above, that the applications holding the 4000 image collection is off-line in four storage cartridges. If the information about them is listed in the current library (i.e., there is a bill of materials file copy of each of them in the library), library editor can perform the VIEW CONTENTS, SEARCH CONTENTS and RETAIN REFERENCE actions without the actual applications and their objects being on-line themselves. Thus the collection information can be viewed and searched and references retained without having the actual collections mounted on-line. Only when an object itself has to be accessed (such as for editing or viewing the actual object) does the object have to come on-line. This enables the searching and qualifying process to be done (assuming it can be done on object names and descriptions) without requiring continuous mounting and dismounting of storage media.

EDITOR PATHING

Access to objects by the various editors is done through the library editor and its applications and references. The pathing rules for the current object sent to an editor are as follows. Within library editor, if the cursor is placed on the line of an F or R type object and an editor is invoked by an action such as EDIT FILE, that object will be accessed as an existing object. F type objects are sought within the current application/directory, R type objects are sought on the path specified in their reference fields. The editor retrieves the object accordingly, and when and if it saves that object back to disk, it uses the same path and overlays (replaces) the existing version stored there.

STORY PATHING

Within any story there may be many SHOW, PLAY, TELL, etc. statements referring to images, audio files and other stories. The pathing priorities for these are as follows. Whenever a statement has a specific path assigned, then that explicit path is used. If the object is not found in that path, then a not-found situation occurs and no further path searching is done.

Within a current story, pathing priorities, when no qualified path accompanies an object name, are as follows. First the current application/directory is searched for a file of the proper type and name. If that does not yield a "hit" then all the other paths associated with that application are searched for a "hit". These other paths include all the path references that exist in that application—in other words all the paths specified in the rightmost column of the Application Table for R type lines. The paths are searched in the order they exist (from top to bottom) in the Application Table. The first "hit" found is returned to the story as the object to use. If no hit at all is found, then a not-found condition is returned to the story.

In summary, all object information can be divided into subsets referred to as applications. Each application is a directory which resides on a disk drive. When library editor displays an application bill of materials on the screen, it displays all the information that exists in the library for this subset. When an object is read from or written to disk, the name of the application in process is used as the name of the directory to physically work from (whenever there is no overriding explicit path to use).

Within an application there can exist references which point to other applications. These references enable one application to conveniently use an object physically stored in another application by naming the object and providing the reference to where it truly is stored. To acquire such references, the VIEW CONTENTS action allows a referenced application to have its bill of materials information temporarily displayed. RETAIN REFERENCE allows lines from that display to be permanently attached to the current application as references pointing to other applications. WITHDRAW ALL VIEWS will remove all the temporary lines from display. SEARCH CONTENTS does the same as VIEW except it allows a selective display of bill of materials information.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. In a data processing system which includes a central processor including an arithmetic logic unit, memory and a plurality of application files, certain application files acting as library repositories for audio/visual objects which are includable in other application files, each said audio/visual object including a name by which said audio/visual object is uniquely identifiable, a method carried out by said central processor for referencing audio/visual objects listed in said library repositories, comprising:

(a) creating in memory in said data processing system, a new application that includes a plurality of objects of one or more types, said types including reference objects which are included in said new application only by name, and objects which are defined in said new application by code residing therein;

(b) creating in said memory a multi-line listing of objects for said new application, said listing including data concerning reference objects, said multi-line listing being independent from objects included in said new application, each line of said multi-line listing including data comprising a first field area for an object's name and a second field area for a reference object's path definition to a different application containing code for said reference object; and (c) operating said data processing system to perform said new application and to access the objects included in said new application where any said reference object is referenced by accessing said multi-line listing, fetching said path definition associated with the reference object, and accessing said code for said reference object in said different application using said path definition.

2. The method of claim 1 wherein the said step of accessing said code for said reference object further comprises the step of inserting said code into said new application.

3. The method of claim 2 wherein said code inserted from said different application into said new application, has appended a path definition to said different application.

4. The method of claim 3 wherein an accessed reference object is a directory listing of objects, said directory listing of objects thereby being inserted into said new application.

5. The method of claim 3 comprising the added steps of:

denoting any reference object whose code is to be retained in said new application; and eliminating non-denoted reference object code listings.

* * * * *